INVENTOR
GEORGE J. CRITS

United States Patent Office 3,537,989
Patented Nov. 3, 1970

3,537,989
DEMINERALIZATION SYSTEM
George J. Crits, Havertown, Pa., assignor to Crane Co., Chicago, Ill., a corporation of Illinois
Continuation-in-part of application Ser. No. 784,077, Dec. 16, 1968. This application Oct. 3, 1969, Ser. No. 870,421
Int. Cl. B01d 15/06
U.S. Cl. 210—32          14 Claims

ABSTRACT OF THE DISCLOSURE

A high efficiency demineralization system involves passing raw water through weak and strong acidic cation exchange resins and thence through a mixed bed of weakly and strongly basic anion exchange resins and a strongly acidic cation exchange resin. In rejuvenation the mixed bed is stratified to separate the cation exchange resin from the anion exchange resins and regenerant acid is passed first through the cation exchange resin previously in the mixed bed and thence through the cation exchange resins in the separate cation exchange unit. Regeneration of the anion exchange resins is effected by alkali which is isolated from the separated cation exchange resin.

CROSS-REFERENCE TO RELATED APPLICATION

This application is in part a continuation of application Ser. No. 784,077, filed Dec. 16, 1968, now abandoned.

FIELD OF THE INVENTION

The invention relates to demineralization of water and particularly to improvements over existing processes and apparatus to secure high efficiency in various respects.

DESCRIPTION OF THE PRIOR ART

In prior art demineralization processes, the water has been directed through cation exchange resin and anion exchange resin beds in series in numerous fashions, and has also been directed through mixed beds of such cation and anion exchange resins, which latter beds require separation of the resins for effective regeneration. The prior practices have been generally inefficient in requirements of regenerants considerably in excess of stoichiometric requirements. They have also been generally deficient in securing the highest quality demineralized effluent when simple in form, high quality generally requiring relatively elaborate and expensive apparatus and procedure and also considerable wastage of water. Deficiencies have particularly existed when the quality of water treated was subject to substantial variations in composition and rate of flow.

SUMMARY OF THE INVENTION

In accordance with the invention, water to be demineralized is passed first through a cation exchange unit including a pair of cation exchange resins, one of them weakly acidic and the other of them strongly acidic. It is then passed through a mixed bed composed of both weakly and strongly basic anion exchange resins and a strongly acidic cation exchange resin. For regeneration of cation exchange resin, the constituents of the mixed bed are separated into two parts, one comprising the strongly acidic cation exchange resin and the other the anion exchange resins. An acid regenerant is then first directed through the separated cation exchange resin and thence through the cation exchange unit. Regeneration of the anion exchange resins is effected by alkali. A rinsing operation is effected by passing water through the cation exchange unit and then through the anion exchange resins but with diversion from the separated cation exchange resin. The resins in the second unit are then mixed for on-stream operation.

DESCRIPTION OF THE PREFERRED EMBODIMENTS

Figure 1:
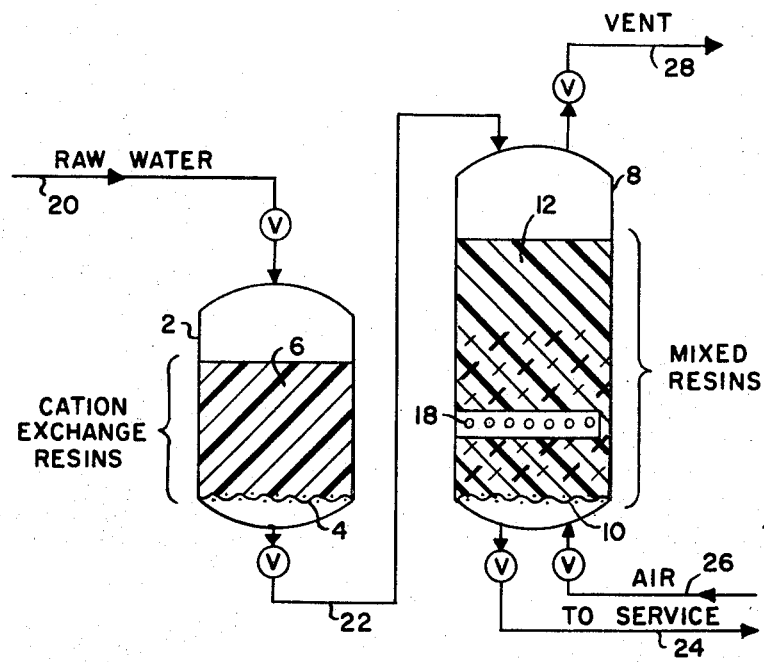
FIG. 1 is a structural and flow diagram illustrating apparatus and certain steps of the procedure for carrying out the invention.
Figure 2:
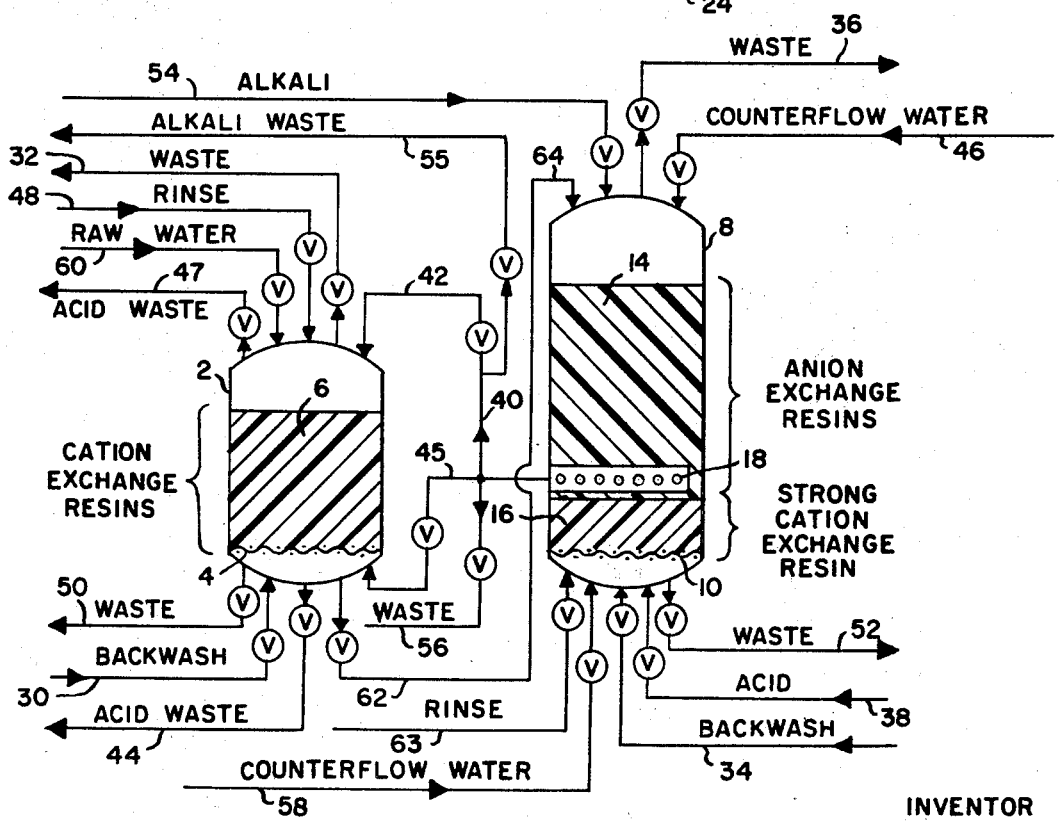
FIG. 2 is a similar view particularly relating to the regeneration steps of the process.

FIGS. 1 and 2 are provided to illustrate one preferred embodiment of the invention. The two figures are used rather than one to illustrate the differences in disposition of certain of the resins during various steps of operation. Flow connections which are illustrated are only those pertinent to the individual figures, and illustrative of operation. It will be understood that numerous connections and their valves may be combined in actual apparatus, but they are shown more elaborately and separated in order to provide legends clarifying the steps involved.

A cation exchange unit is indicated at 2 and consists of a tank of conventional type provided with a perforated bottom 4 (for example, a screen) adapted to support a bed of cation exchange resins. For consistent description of a first modification, it may be assumed that the bed comprises admixed two cation exchange resins, one of them strongly acidic and the other weakly acidic. (As will appear later, the invention may be carried out by having these resins separated by layering during on-stream operation.) Alternatively a bi-functional single resin having both weak and strong properties may be utilized.

What functions primarily as an anion exchange unit as such, is indicated at 8, and is also a tank provided with a perforated bottom 10 serving to support a resin bed 12 which, in the case of what is shown in FIG. 1, comprises, in admixed form, three resins: a strongly basic anion exchange resin, a weakly basic anion exchange resin, and a strongly acidic cation exchange resin. While these resins are mixed when the bed is on-stream, the mixture is not necessarily homogeneous, and, in fact, the cation exchange resin may be primarily only in the mid and lower portions of the bed while the upper portion contains, primarily, only the anion exchange resins. This situation is illustrated by the dotted hatching running from upper right to lower left in the mid and lower portions of the bed and representing the cation exchange resin content of the bed, this direction of hatching being consistently used for cation exchange resin, while hatching from upper left to lower right is used for anion exchange resin.

In FIG. 2, the cation exchange unit is the same as in FIG. 1; but in FIG. 2 the anion exchange unit is shown as comprising the separated beds 14 and 16, the former consisting of the anion exchange resins, while the lower bed 16 comprises primarily the strong cation exchange resin. At the surface of division between these resins, after their layering or stratification, there is located an outflow connection 18 conventionalized as consisting of pipes provided with perforations which are sufficiently small to prevent outflow of resin particles. The outflow connection is illustrated in FIG. 1, but plays no part in the operations to which that figure pertains.

Before proceeding to a description of the operating steps, references may be made to the connections which, as stated, are shown primarily in functional fashion rather than in the obvious structural arrangement which would be used in practice to lead to economy of piping and valves. All of the connections are shown as valved, and it will be understood that in practice these valves will generally be programmed for open and closed positions in accordance with the flows which are to take place.

A raw water connection 20 leads to the top of the cation exchange unit 2, from the bottom of which there runs the connection 22 to the upper end of the anion exchange unit 8. A service connection 24 leads the demineralized water to the point of use.

To secure admixture of the resins in the unit 8, provision is made at 26 for the entrance of air, which is vented at 28.

In FIG. 2 there are shown the connections which are primarily involved when layering of the resins in unit 8 is being effected or used in regeneration. A backwash connection 30 leads to the lower end of the unit 2, and the backwash is run to waste through the connection 32 at the top of this unit. A similar backwash connection 34 runs to the lower end of the unit 8 with provision for flow to waste at 36.

Entry of acid for regeneration occurs at 38, and discharge of regenerant acid takes place through the connection 18 and the successive lines 40 and 42 into the top of the cation exchange unit 2. An acid waste line is indicated at 44 and will generally run to a receiver different from other waste lines which may run directly to a sewer. An alternative upward flow of acid through the unit 2 is provided through connection 45, and if this flow occurs the waste acid flows outwardly through connection 47. As will appear more fully hereafter, counterflow water is introduced at 46 into the upper portion of the anion exchange unit 8, joining the acid flowing outwardly through connection 18.

A rinse water connection 48 is shown as running to the top of the cation exchange unit 2. This connection is shown as separate from connection 60 for raw water which in turn is shown as separate from connection 20 in FIG. 1, though all three may consist of a single connection. Rinse water which may contain only a small amount of acid may be run to waste through connection 50, though initial rinse, richer in acid, may flow outwardly through connection 44.

A waste connection 52 is also provided at the bottom of anion exchange unit 8.

Provision is made for flow of alkali regenerant at 54 into the top of the anion exchange unit 8. Alkali waste runs from connection 18 through the series connections 40 and 55. There is also a second waster connection 56 from the connection 18 which may run to a sewer, whereas the alkali waste connection 55 may run to a tank for neutralization of acid waste or for other use. During alkali regeneration, counterflow water is caused to flow at 58 into the bottom of the unit 8.

Reference has already been made to the raw water connection 60, and where this water is introduced for anion resin rinsing it passes from the bottom of unit 2 through connection 62, 64 into the top of unit 8.

A complete cycle of what has been described is as follows:

The cation exchange unit contains a strongly acidic cation exchange resin such as Rohm and Haas IR–120 or 122, Dow HCR, HDR or HGR, or Duolite C–20 and a weakly acidic cation exchange resin such as Rohm and Haas IRC–50 or IRC–84, or Duolite CC3. In this first description it may be assumed that these resins are mixed either thoroughly or partially. References to layering will be made hereafter. A bi-function cation resin may be used as stated.

In the anion exchange unit 8, the weakly basic anion exchange resin may be Rohm and Haas IRA–93, or the like, while the strongly basic anion exchange resin may be Rohm and Haas IRA–402, or Dowex SBR–P or other Type I anion resins. The strongly acidic cation exchange resin may be of the same type as in the unit 2. In accordance with the invention, the anion exchange resins and the cation exchange resins will be such that both of the anion exchange resins will have an effective specific gravity less than that of the cation exchange resin, so that layering may be effected to provide good separation of the strong cation exchange resin as a lower layer. Preliminarily it will be assumed that the two anion exchange resins may remain substantially mixed, though as will be pointed out later layering of these may also be effected. In any event, during on-stream operation, all of the resins will be admixed as indicated in FIG. 1, though the mixture may not be uniform throughout the unit, but rather, the cation exchange resin may be more concentrated in the lower portion of the unit while in the upper portion there may be little, if any, cation exchange resin.

The mixed anion exchange resins may be replaced by a bi-functional or more efficient anion exchange resin such as Type II anion exchange resin.

Referring to FIG. 1, the demineralization of the raw water entering at 20 takes place by a downward flow in series through the two units, with delivery of the water at 24, the water passing from the bottom of the unit 2 to the top of unit 8 through the connection 22. All other connections are at this time closed. The cations will be primarily removed in the cation exchange unit 2. The anions will be removed by the anion exchange resin in the unit 8. Any residual cations, including any sodium resulting from the alkaline regeneration of the anion exchange resins, will be effectively removed by the strong cation exchange resin within the unit 8. As will appear hereafter, this cation exchange resin will be very thoroughly regenerated by acid, so that it has a very high capability of removing residual cations. This action is effectively one of "polishing" the water in a sense of removal of last vestiges of cations.

When regeneration is required, on-stream flow is stopped and both of the units are backwashed. Backwash water enters the cation exchange unit at 30 and may run to waste at 32 along with removed solid dirt. Since separation of the cation exchange resins is not desired during downflow regeneration, this flow should be carried out without regard to effecting stratification.

Separate backwash enters the anion exchange unit at 34 and flows to waste at 36. The backwashing is so carried out (in conventional fashion by control of flow rates) that after the end of the backwashing operation the resins will be layered or stratified by differential settling as indicated in FIG. 2. A minimum of strong cation exchange resin is used to secure the desired polishing results. It has been found that in practice the cation exchange resin in its layered position need only be around 18″ deep. The amount of this resin and the position of the outlet connection 18 are so related that the upper face of the cation exchange resin lies substantially at the connection 18, as illustrated in FIG. 2, the face, in practice, not being sharply defined.

Following the completion of the backwashing and layering, the system is ready for regeneration of the cation exchange resins by an acid, sulphuric acid being usually used, though other acids may be used, e.g. hydrochloric acid, nitric acid, etc. The regenerating acid enters at 38, passes through the layer of the strong cation exchange resin at 16 and thence outwardly through the connection 18 and (in one alternative operation) through connections 40 and 42 into the upper end of the unit 2, and flows downwardly through the cation exchange resins at 6 and passes outwardly through the acid waste connection 44. In order to prevent the acid regenerant from passing into the major portion of the anion exchange resins, counterflow water is introduced at 46 to flow downwardly through the anion exchange resins and thence outwardly through the connection 18, joining the flowing acid. By this arrangement only a minor portion of the anion exchange resins is treated with acid. As will appear, this minor portion of anion exchange resin is mixed during on-stream operation with that which is unaffected.

Alternatively, and preferably, the acid regenerant is directed from connection 18 through connection 45 for upward flow through unit 2, with outflow at 47, other conditions being as last described.

It will be evident that the strong cation exchange resin 16 will be thoroughly regenerated because it is engaged by large quantities of fresh acid in comparison with its quantity which is kept at a minimum. It is thus ultimately capable of removng the last traces of cations. The cation exchange resins in the unit 2 are also effectively regenerated, though it is not so necessary to effect complete regeneration because during on-stream operation the cation exchange resin in the mixed bed is effective to capture and remove the residual cations. The use of a restricted quantity of resins here also effects economy in the use of acid, the economy also being improved by upward rather than downward flow of the regenerant through unit 2.

The counterflow water may be small, or it may be large in quantity to effect the proper dilution for regeneration of the weakly acidic cation resin the cation exchange unit.

After the described regeneration has been completed to the extent desired, acid flow is cut off and connections are made for water rinsing as follows:

The cation resin in tank 8 is rinsed by introducing rinse water at 63 to flow out at 18 and through 42 (or 45) to tank 2, and this water also serves as the slow rinse for displacing the acid from cation unit 2. At the end of this acid displacement, the cation resin in the mixed bed 8 is partially rinsed. Additional rinsing is achieved by the counterflow water operation during the subsequent alkali introduction described below.

The cation exchange unit is finally rinsed by water flowing in at 48 and out to waste at 50, or initially at 44. This rinsing may continue during the subsequent regeneration of the anion exchange unit 8.

Regeneration of the anion exchange resins is effected by the introduction of alkali at 54 with outflow through connection 18 and connections 40 and 55 to the point for delivery of alkali waste, while at the same time counterflow water is introduced to the lower end of tank 8 at 58 to flow outwardly through connection 18, joining the outflowing alkali. By use of this arrangement a barrier condition is achieved keeping alkali away from the cation exchange resin bed 16.

Displacement of alkali and slow rinse of the anion exchange unit 8 may be effected by introducing the flow of water at 46 with opening of the waste connection from 18 at 56. This will remove the residual NaOH existing in any anion portions of the separated beds.

Following the completion of the regeneration and slow displacement and rinse of the anion exchange resins, a fast rinse may be achieved by arrangement of the connections so that raw water enters through connection 60 at the upper end of the cation exchange unit to flow downwardly through the bed 6 and thence through connection 62 to the top of the unit 8 at 64, with outflow through connection 18 and then through connection 56 to waste. During this rinsing operation the flow of water is continued through connection 58 to prevent the entry of any alkali into the strong cation exchange resin at 16, the counterflow water joining the rinse water at connection 18.

The last rinsing cycle is carried out to secure complete rinsing of both units, and the resins are now in condition to be returned to demineralization action. Prior to on-stream flow, however, the mixed bed illustrated in FIG. 1 is reestablished by interrupting water flow and introducing agitating air at 26, the air being vented at 28. After sufficient flow of air is provided to achieve the desired admixture (as referred to previously) the entire apparatus is in condition for the resumption of on-stream flow as first described above.

The advantages of what has been described are the following:

First, there is considerable saving of both acid and alkali involved in the regeneration, together with a saving in the amount of waste water. Typically, these aspects have been found to be as follows:

In the treatment of the water containing 100 to 500 parts per million of total dissolved solids (consistently herein reckoned as calcium carbonate) effluent was obtainable containing only 0.1 to 1.0 part per million of total dissolved solids. For these successive examples, the water wasted in the regeneration of a cycle amounted, respectively, to 4% and 19% of the water treated. The pounds of sulphuric acid involved in regeneration per kilograin of total dissolved solids introduced ranged from 0.18 to 0.21, amounting to 128% to 150% of the theoretical stoichiometric amount. Upflow of regenerant acid in the cation exchange unit 2, as described, usually makes possible the use of less acid for a given raw water composition.

In the case of alkali regenerant, the pounds of sodium hydroxide per kilograin of total dissolved solids ranged from 0.18 to 0.20 or around 126% to 160% of the theoretical amount. As compared with prior practices, these figures represent substantial savings in both waste water and regenerants.

A further advantage of the practice in accordance with the invention is the high tolerance to varying compositions of influent water and rate of flow thereof, giving rise to very high quality effluent and accordingly flexibility of operating conditions.

The foregoing advantages are secured consistently with simplicity of initial equipment leading to low initial and operating costs for the production of high quality demineralized water.

The alkali dosage utilized for regeneration is very low at the levels of 2 to 3 lbs. NaOH per cu. ft. of mixed anion resins.

The acid dosage utilized for regeneration is very low in the neighborhood of 1.5 to 2.5 pounds of sulphuric acid per cubic foot of total cation exchange resins contained in both units. Considering only the cation exchange resin in the anion exchange unit (which gets the acid first) the dosage based on this smaller quantity is quite high, for example, 2.5 to 4 times normal; but this higher dosage assures high quality water from it as it is contained in the mixed bed. But, the residual acid from this particular cation exchange resin is then utilized almost completely in the cation unit, and accordingly the cation exchange resins therein should constitute a rather deep bed, for example in excess of three to four feet. This means that more capacity can be built into the cation unit. The cation exchange resins in the mixed bed, when separated should form a minimum layer which may be about eighteen inches deep, this depth representing about the lowest practical depth consistent with proper separation and operation.

If the amount of regenerant acid is restricted too much for example below 1.5 pounds per cubic foot of total cation exchange resin, very high acid efficiency would be obtained, but the anion exchange capacity of the mixed bed suffers to some extent due to the absence of free mineral acid developing in the cation exchange unit. Accordingly, the acid dosage is desirably adjusted depending upon the composition of the water being treated to insure that enough acid is being used to create a free mineral acid content in the latter parts of service runs. A substantial free mineral acid content is required for the following reasons:

The weak base anion exchange resin, such as IRA-93, in the mixed bed is only capable of removing free mineral acid whereas the strong base anion exchange resin, such as IRA-402, is capable of removing free mineral acid at a lower efficiency. Therefore, if it is desired to have the highest possible anion exchange resin efficiency, or caustic efficiency, in the anion section of the mixed bed, there must be some free mineral acid from the cation unit. This is provided by the use of both weak and strong cation resins in the cation unit. The use of only a carboxylic resin would give a very high acid efficiency, but would not be beneficial to get high anion exchange or caustic efficiency. The carboxylic resin, the weakly acidic cation exchange resin, is required to help absorb some of the waste regenerant acid because it is more efficient for absorbing acid during the regeneration. On the other hand, if the water does not have any alkalinity, this resin is then inefficient. Therefore, to a certain degree, the ratio of the weakly acidic cation resin to the strongly acidic cation resin should be adjusted according to the alkalinity of the influent water. It is indicated that desirably the weakly acidic cation resin should be about one-fourth to one-half of the cation exchange resin mixture. For example, with alkaline raw water in the vicinity of 30% methyl orange alkalinity, the weak acid resin should be about 7.5% to 15% of the total cation exchange resin in the cation exchange unit. If the water has very little or no alkalinity, no weakly acidic cation resin will be required.

Reference may now be made to the alternatives which may be involved in practicing the invention as compared with what has already been described as a specific embodiment.

First, while the flow of acid regenerant has been described as upwardly through the separated resin 16 (FIG. 2), the flow of this regenerant may be downwardly rather than upwardly, i.e., the acid may enter at the connection 18, acting as a distributor, and may flow downwardly through the separated strong cation exchange resin and may thence go to the top (or bottom) of the cation exchange unit 2, with introduction of counter flow water at 46 to keep acid out of the anion exchange resins, the water joining the acid at the bottom of the anion exchange bed. The result is equivalent to that secured by the regenerant flow already described.

Reference was heretofore made to admixture of the cation exchange resins in the exchange unit 2. Admixture of the cation exchange resins during regeneration is desired because the strong acid regenerant passing into the top of this unit should meet the strongly acidic cation exchange resin initially even though this is mixed with the weakly acidic resin. However, during on-stream flow, separation of these resins may have a slight advantage if the weakly acidic cation exchange resin is at the top. If separate beds are thus used, the weakly acidic resin should be of less effective density so as to form a top layer. The separation may be effected after acid regeneration by causing water to flow upwardly through the exchange unit 2 with control of flow rate so that the effectively heavier resin will settle first. By "effectively heavier" reference is made to the usual conditions: a resin which is of higher actual density and formed of larger particles or beads will settle to form a layer more readily than one of less density and smaller particles or beads. Even if the resins are of substantially the same actual density, particle sizes may determine settling and the production of layers. The foregoing is desirable if the on-stream flow is downward, though a reversed condition would be involved if the flow is upward. It will be evident that except for the matter of physical handling either upward or downward on-stream flow may be involved, though for the purpose of convenient backwashing and removal of dirt downward flow is more desirable.

With the cation exchange resins separated and the stronger forming the lower layer, regeneration should be by upward flow of acid as described.

As to the anion unit, as already described admixture of the resins during on-stream operation is desirable, though for optimum operation care should be exercised to insure that at least a major portion of the cation exchange resin should be in the lower portion of the bed, it being relatively immaterial whether the cation exchange resin exists in the uppermost portions of the mixed bed. There may, however, be some separation of the anion exchange resins in which case the weak base anion resin should be at the top of the bed, with suitable choice of densities and sizes of the anion exchange resins. A little advantage is obtained if the weakly basic anion resin should first be reached by the free mineral acid coming from the cation exchange unit. To secure the separation, there may be introduced an additional step after regeneration, rinsing and mixing, by a backwashing flow upwardly from the interface connection 18. This may float most of the weakly basic resin to the top. However, with the use of the light density weakly basic anion resin, a highly fluidized air mixing operation in tank 8 generally produces a semi-mixed, partially stratified condition which is rather efficient for demineralizing most waters.

A vacuum degasifier or decarbonator may be inserted between the cation and anion units during on-stream operation. This removes liberated carbon dioxide which would otherwise require more anion exchange resin for the treatment of a given amount of water. Saving of expensive anion exchange resin would thus result, as well as substantial saving in the regeneration of such resin.

It will be evident that various other modifications in procedure may be adopted, nevertheless securing the advantages of the invention.

What is claimed is:

1. A water demineralizing process comprising, in the treatment of the water, passing it first through a cation exchange resin bed and then through a bed containing at least a partial admixture of an anion exchange resin and a strongly acidic cation exchange resin; and comprising, in regenerating the resins, the steps of separating the cation exchange resin of the mixed bed from the anion exchange resin thereof, treating with regenerant acid, in series, first the so separated cation exchange resin and then, with the same regenerant acid, said first mentioned cation exchange resin, regenerating with alkali the so separated anion exchange resin, rinsing regenerants from all of said resins, and, following the rinsing, readmixing the previously separated anion and cation exchange resins to provide the mixed resin bed for further treatment as aforesaid of water to be demineralized.

2. The process of claim 1 in which the first mentioned cation exchange resin bed comprises cation exchange resins of both weakly and strongly acidic types.

3. The process of claim 1 in which the first mentioned cation exchange resin bed comprises mixed cation exchange resins of both weakly and strongly acidic types.

4. The process of claim 3 in which the cation exchange resins of the first mentioned bed are admixed during regeneration but are separated during water treatment with water flowing first through the weakly acidic cation exchange resin.

5. The process of claim 1 in which said anion exchange resin comprises a mixture of weakly and strongly basic anion exchange resins.

6. The process of claim 1 in which, in rinsing, the anion and cation exchange resins are first separately rinsed, and then rinsing is carried out by passing water, in series, first through the first mentioned cation exchange resin bed and then through the anion exchange resin.

7. The process of claim 2 in which, in rinsing, the anion and cation exchange resins are first separately rinsed, and then rinsing is carried out by passing water, in series, first through the first mentioned cation exchange resin bed and then through the anion exchange resin.

8. The process of claim 3 in which, in rinsing, the anion and cation exchange resins are first separately rinsed, and then rinsing is carried out by passing water, in series, first through the first mentioned cation exchange resin bed and then through the anion exchange resin.

9. The process of claim 4 in which, in rinsing, the anion and cation exchange resins are first separately rinsed, and then rinsing is carried out by passing water, in series, first through the first mentioned cation exchange resin bed and then through the anion exchange resin.

10. The process of claim 5 in which, in rinsing, the anion and cation exchange resins are first separately rinsed, and then rinsing is carried out by passing water, in series, first through the first mentioned cation exchange resin bed and then through the anion exchange resin.

11. The process of claim 1 in which the regeneration of the first mentioned cation exchange resin is effected by upward flow of the acid therethrough.

12. The process of claim 1 in which the regeneration of the first mentioned cation exchange resin is effected by downward flow of the acid therethrough.

13. The process of claim 2 in which the regeneration of the first mentioned cation exchange resin is effected by upward flow of the acid therethrough.

14. The process of claim 2 in which the regeneration of the first mentioned cation exchange resin is effected by downward flow of the acid therethrough.

References Cited

UNITED STATES PATENTS

| 2,660,558 | 11/1953 | Juda | 210—35 X |
| 2,771,424 | 11/1956 | Stromquist et al. | 210—35 X |
| 3,414,508 | 12/1968 | Applebaum et al. | 210—32 |

FOREIGN PATENTS 595,314  3/1960  Canada.

SAMIH N. ZAHARNA, Primary Examiner